Sept. 15, 1959   E. C. MITCHELL   2,903,777
MOLD FOR HOLLOW ARTICLES
Filed Feb. 16, 1956   3 Sheets-Sheet 1

INVENTOR.
EARL C. MITCHELL

ATTORNEYS

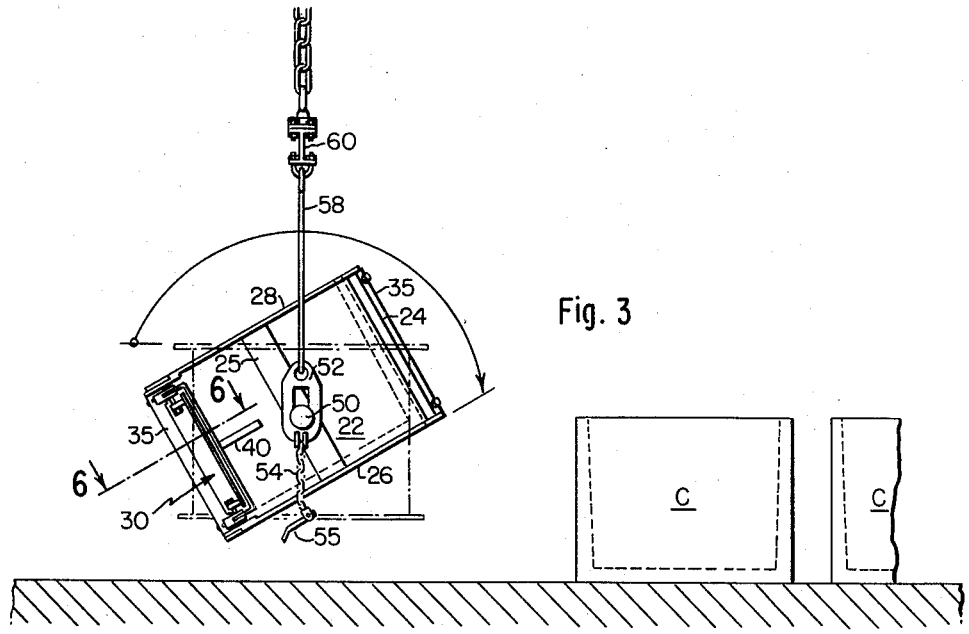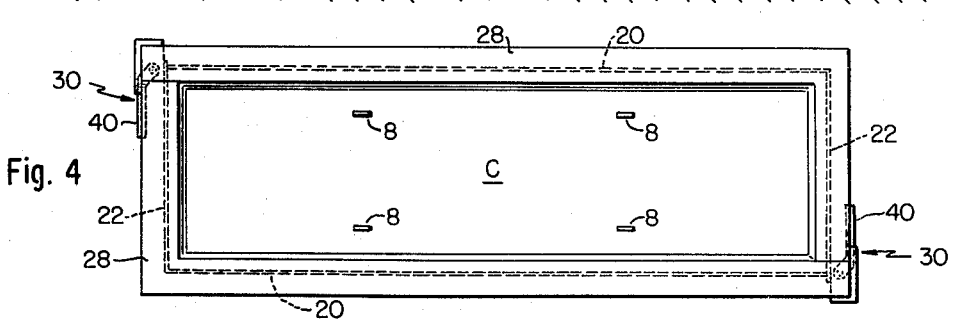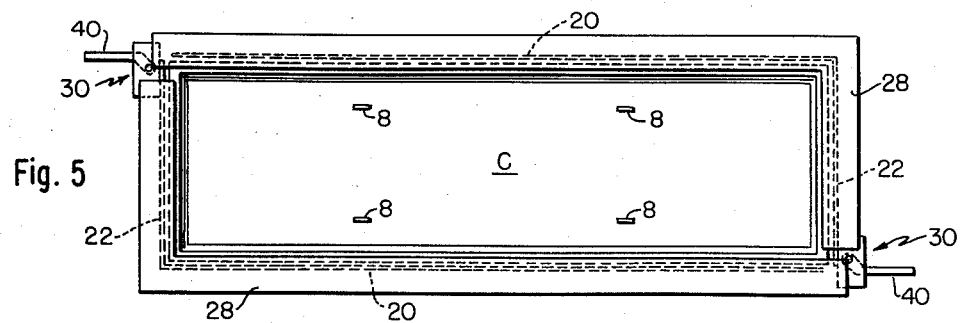

Sept. 15, 1959 E. C. MITCHELL 2,903,777
MOLD FOR HOLLOW ARTICLES
Filed Feb. 16, 1956 3 Sheets-Sheet 3
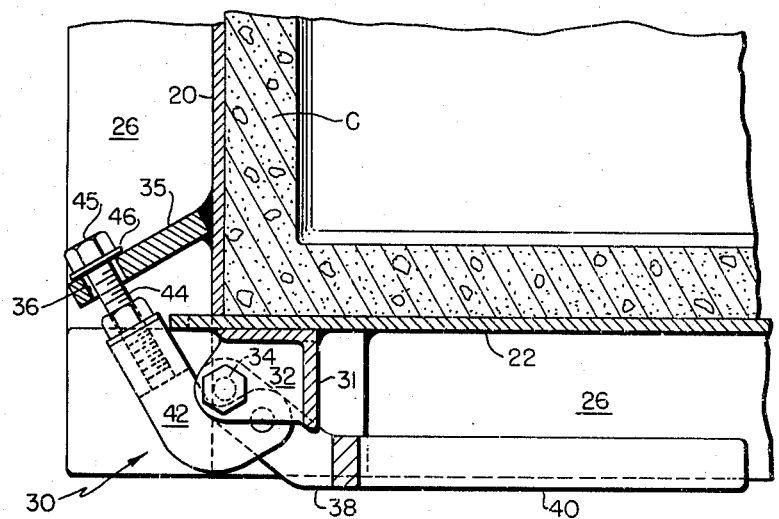
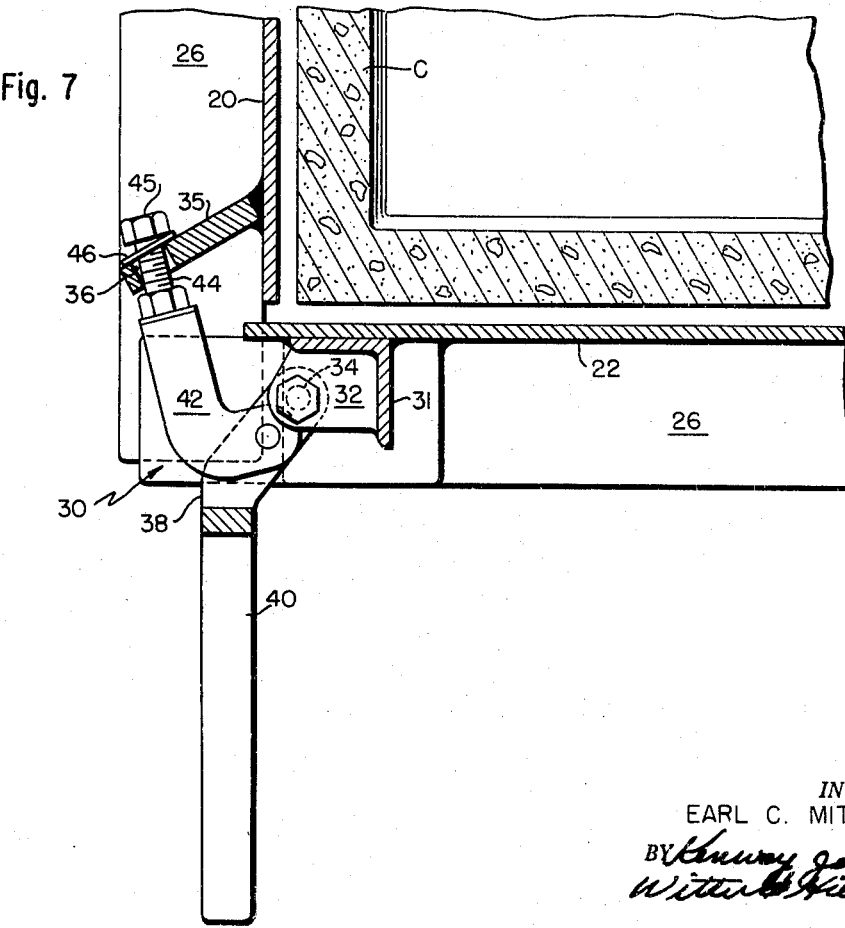
INVENTOR.
EARL C. MITCHELL
ATTORNEYS

United States Patent Office 2,903,777
Patented Sept. 15, 1959

2,903,777

MOLD FOR HOLLOW ARTICLES

Earl C. Mitchell, Newton, Mass., assignor to Watertown Engineering Corp., Watertown, Mass., a corporation of Massachusetts Application February 16, 1956, Serial No. 565,828

4 Claims. (Cl. 25—130)

In the manufacture of molded hollow articles of various geometric shapes such as concrete vaults, septic tanks, etc., it is necessary to provide an inner section or core and an outer section or form which is disposed in properly spaced relation to the inner section so as to define the mold cavity or part thereof. After the casting or molding operation, the inner and outer sections must be stripped and reassembled for the next molding operation. To this end the inner and outer sections usually comprise an assemblage of interfitting parts which must be carefully put together so as to define a mold cavity of the desired size and shape, and in producing molded articles the time required to assemble and dismember such parts constitutes the major portion of the cost of manufacture.

The principal object of the present invention is to provide a mold having inner and outer sections which may be quickly and accurately assembled preparatory to casting, and subsequently stripped from the cast article without dismembering any of the parts constituting the respective sections, thereby effecting a substantial saving in time and cost of manufacture.

Further objects relate to various features of construction and will be apparent from a consideration of the following description and the accompanying drawings, wherein:

Fig. 3 is an end view illustrating the manner in which the outer section is manipulated preparatory to stripping;

Fig. 4 is a plan view showing the outer section just before stripping;

Fig. 5 is a plan view showing the manner in which the outer section is stripped;

Fig. 6 is an enlarged section on the line 6—6 of Fig. 3, showing the releasable locking means for the outer section; and Fig. 7 is a view similar to Fig. 6 showing the locking means in open or extended position.

In accordance with the present invention I provide a mold suitable for casting such geometric shapes as concrete vaults, septic tanks, containers, culverts, etc., the mold having inner and outer nestable sections with spaced side walls defining the mold cavity. These sections may or may not be geometrically similar, depending upon the particular articles to be cast or molded and either or both sections may have the shape of a cylinder, a polygon, or other figure.

The inner section is of non-collapsible, rigid construction having a smooth continuous outer surface and its lower end is preferably formed with an outwardly extending integral flange. The outer section is open ended so that it may fit or be nested about the inner section and its lower end is formed with an inwardly directed flange capable of supporting the casting. The outer section is formed with adjoining separable edges extending from top to bottom and the marginal portions adjacent these edges are provided with releasable locking means for holding the edges in contiguous relation. Although the outer section is of relatively rigid construction, the adjoining edges are so designed that they may be separated or sprung sufficiently to break the bond between the outer surface of a casting and the inner surface of the section, thereby permitting the casting to be released or stripped. Where the casting is to be formed with a closed end or wall, such as a vault or septic tank, the inner section is formed with a top wall and the top of the outer section may extend above the top wall of the inner section a distance approximating or greater than the thickness of the end wall of the casting, otherwise the top ends may be at approximately the same level.

In order to facilitate the nesting and separation of the sections, the outer section may be provided with lifting means whereby an overhead crane, derrick or the like device may lift the section bodily to and from nested relation. In order to insure ease of stripping the two sections their side wall portions may diverge slightly from bottom to top, and separating wedges, levers or the like may be provided to break the bond between the outer surface of the inner section and the casting. Where, as is preferred, the lower end of the outer section is formed with an inwardly directed continuous flange which snugly fits about the lower end of the inner section and the side wall of the inner section diverges slightly from the side wall of the outer section, the inwardly directed flange carried by the outer section not only provides the bottom wall of the mold cavity, but also a guiding means for properly centering the outer section about the inner section when the outer section is positioned about the inner section.

Figure 1:
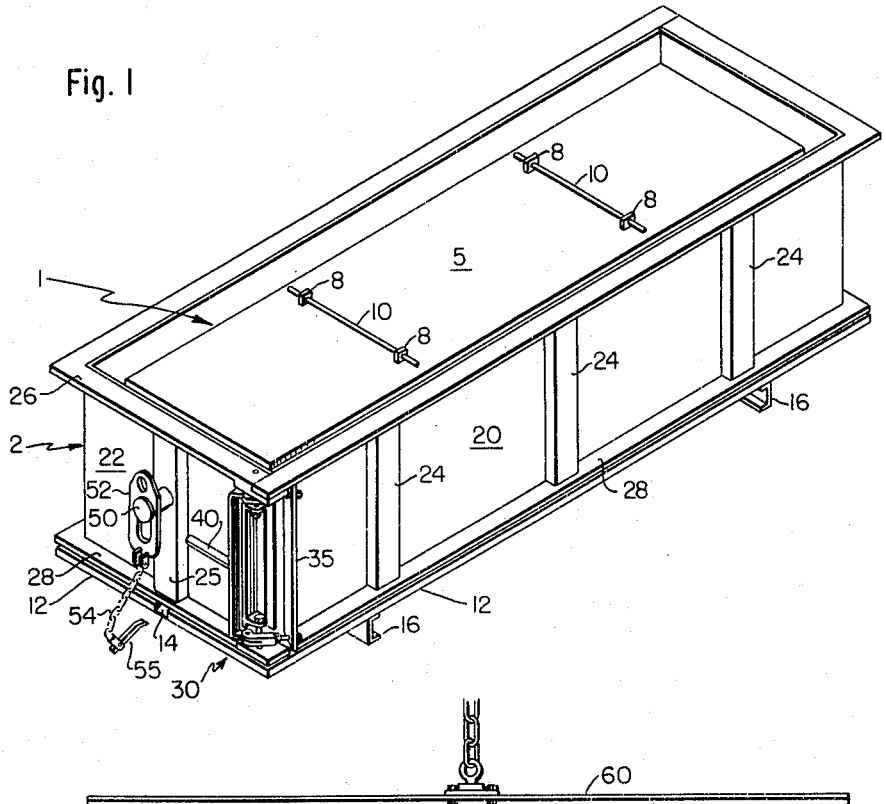
Fig. 1 is an isometric of a mold constructed in accordance with the present invention.
Figure 2:
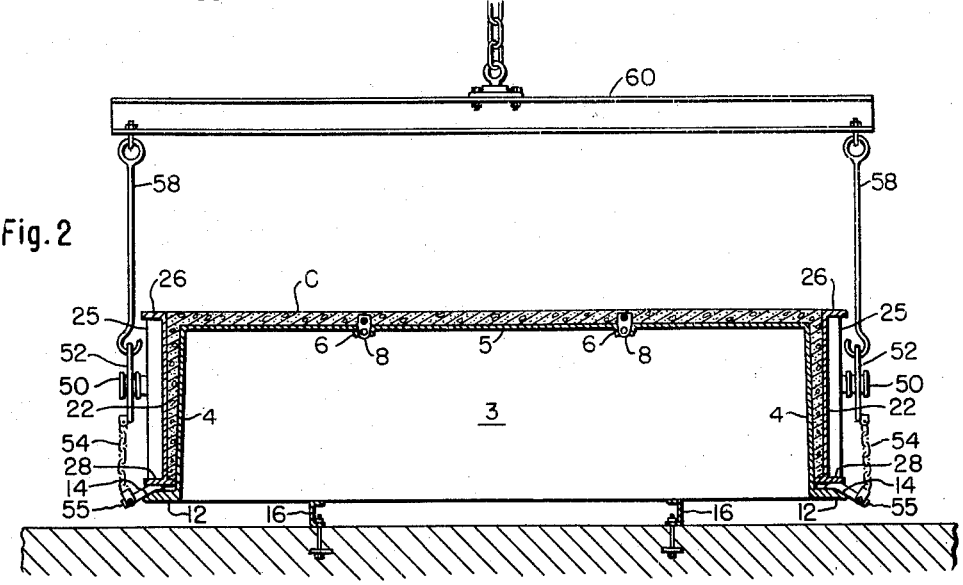
Fig. 2 is a longitudinal section through the loaded mold, illustrating the manner in which the inner section or core is stripped.

The embodiment herein shown is designed for casting concrete vaults and comprises an inner section 1 and an outer section 2 adapted to be telescopically disposed about the inner section so as to define the mold cavity. The inner section is preferably of heavy gauge sheet metal or steel plate construction having integral side, end and top walls 3, 4 and 5 defining an elongate box-like non-collapsible structure, the side and end walls being slightly tapered to facilitate the stripping of the casting from the section. The top wall 5 is formed with spaced openings 6 (Fig. 2) through which project lift hooks or eyes 8 carried by rods 10 adapted to be embedded in the casting. The lower end of the inner section is provided with a laterally extending peripheral flange 12 which is recessed at opposite ends as indicated at 14 (Fig. 1). The flange 12 is welded or otherwise secured to transversely extending channels 16 which may be bolted to the floor, as illustrated in Fig. 2.

The outer section 2 is of a shape similar to the inner section 1 and is likewise of heavy gauge sheet metal or steel plate construction. This section comprises side and end walls 20 and 22 which are slightly higher than those of the inner section so as to define the bottom wall of the casting C. The side and end walls are welded together at two opposite corners, but have their other two opposite corners separable. Reinforcing channels 24 and 25 are provided to insure strength and rigidity. The upper edges of the side and end walls are provided with a laterally extending flange 26 welded at the two opposite corners corresponding to those of the side and end walls, but separable at the intervening corners. The lower edges of the side and end walls are provided with a peripheral flange 28 which overlies the flange 12 and extends inwardly into contiguous relation to the lower edge of the inner section, as shown in Fig. 2. This flange not only provides a reinforcement, but also the bottom wall of the mold cavity and a wedging surface used in stripping the mold from the inner section, as hereinafter explained. Here again the flange 28 is welded together at two opposite corners, but separable at the other two intervening corners, as shown in Figs. 1 and 5.

The separable corners of the outer section are provided with releasable locking means whereby they can be locked together, as shown in Fig. 6, or separated sufficiently to permit the walls of the section to be stripped or separated from the contiguous surfaces of the casting C, as shown in Fig. 7. To this end an angle iron 30 is welded to the side wall 20 adjacent to each separable corner and welded to the angle iron are vertically spaced lugs 32 which support pivot pins 34 or bolts. Welded to the end walls 22 are angularly disposed ears 35 provided with openings 36. The legs of an elongate U-shaped bail 38 are pivotally supported by the pins 34 and the intermediate part of the bail is provided with an operating handle 40. The upper and lower legs of the bail each pivotally support the bifurcated end of an L-shaped link 42, the opposite end of which carries a screw 44 which projects through the adjacent opening 36. A nut 45 and washer 46 carried by the screw 44 provides for adjusting the effective length of the link.

With this construction and arrangement of parts the bail 38 and link 42 provide, in effect, a toggle lock so designed that when the handle 48 is swung to closed position adjacent to the side wall 20, as shown in Fig. 6, the bail 38 acts through the link 42 to pull the side and end walls together and lock them in closed position. When the handle 40 is swung to open position, as shown in Fig. 7, the bail 38, acting through the link 42, swings the side and end walls away from each other sufficiently to separate the inner walls of the section from the outer walls of the casting C, thereby permitting the section to be removed.

The channels 25 carried by the end walls 22 carry flanged studs 50 which are in approximate alignment with the longitudinal center of gravity of the outer section when it supports the casting C. Each stud supports a slotted link 52, one end of which carries a chain 54 and wedge or pry bar 55. The other end of each slotted link 52 is formed with an opening to receive a lifting hook 58 carried by the beam 60 of an overhead crane (not shown). The length of the slot in the link 52 is such that when its upper part is in contact with the stud 50, the chain 54 is sufficiently slack to permit the pry bars 55 to be inserted in the recesses 14, as shown in Fig. 2. When the parts are thus positioned the lifting hooks 58 of the beam 60 may be inserted in the openings at the upper part of the links to exert a lifting force which is transmitted to the pry bars 55, thereby causing the inner section 1 to be separated from the outer section 2 and the casting C carried thereby. Thus, a single lifting action of the beam 60 is effective first to separate the parts and then bodily lift the outer section and casting from the inner section, as illustrated in Fig. 3.

In using the mold the walls of the outer section are first closed and locked and the overhead crane or other mechanism then lifts the outer section into position about the inner section, as shown in Fig. 1, and it will be noted that as the inwardly extending flange 28 loosely fits about the top and snugly fits about the bottom of the inner section it provides a guide which insures correct positioning of the two sections. Having thus assembled the sections they are first sprayed with a light oil to facilitate stripping and then the reinforcing wires and rods 10 carrying the eyes 8 are applied, after which a concrete mix is dumped onto the top of the inner section and worked into the mold cavity. The upper surface of the concrete is then smoothed or troweled and the casting C is permitted to stand for a period sufficient to undergo an initial set, usually about twenty hours.

After the casting has set the overhead crane lowers the beam 60 into position and after inserting the pry bars 55 into the recesses 14 the hooks 58 are connected to the slotted links 52, as shown in Fig. 2. Lifting force applied to the hooks first takes up the slack in the chains 54 and then operates the pry bars 55, the result of which is to separate the inner section from the outer section along with the casting C.

The crane bodily lifts the outer section and casting to one side and the parts are then rotated, as shown by the arrows in Fig. 3, to bring the casting from upside down position to rightside up position. Since the section and casting are supported on an axis coinciding approximately with their longitudinal center of gravity, rotation of the section requires little effort. After having set the section and casting on the floor or other suitable support, the handles 40 are then swung to open position, as shown in Figs. 5 and 7, thereby causing the side and end walls to separate from the contiguous surfaces of the casting and permitting the crane to lift the section from the casting. The handles 40 are then swung back to locking position (Figs. 4 and 6) and the crane now lifts the section back into position about the inner section, preparatory to repeating the casting operation.

An important feature of the invention is the provision of the flange 28, the inner part of which not only serves accurately to guide and position the outer section about the inner section, but also provides a protective support for the casting which permits it to be lifted from the inner section without danger of separating or injury, while the outer part of this flange provides a wedging surface against which the pry bars 55 act.

The time required to strip and reassemble the mold is approximately ten to fifteen man minutes, as compared to fifty to sixty man minutes usually required for the conventional molds. Since labor represents a major cost in producing a casting, the saving is substantial.

While I have shown and described one desirable embodiment of the invention it is to be understood that this disclosure is for the purpose of illustration and that various changes and modifications may be made without departing from the spirit and scope of the invention as set forth in the appended claims.

I claim:

1. A mold of the character described, comprising inner and outer nestable sections having spaced side walls defining the mold cavity, the outer section having an open end through which the inner section withdraws when the sections are separated, the outer and inner sections having adjacent outwardly disposed flanges when the sections are nested, lifting means carried by the outer section, wedging means adapted to be disposed intermediate the flanges, and connections between the lifting means and the wedging means for actuating the latter to separate the flanges upon application of lifting force to the lifting means.

2. A mold as set forth in claim 1 wherein the lifting means carried by the outer section is movable relative thereto over a limited range of movement.

3. A mold as set forth in claim 1 wherein the lifting means comprises a member having a slot and wherein a flanged stud extends through said slot to connect the member to the outer section with provision for relative sliding movement in the direction of the slot.

4. A mold as set forth in claim 1 wherein the lifting means comprises a pair of slotted members and wherein flanged studs extend through said slots and are secured to the outer section at points adjacent to a line through the center of gravity of the outer section to connect the members to the outer section with provision for sliding and pivoting movement of said members relative to the outer section.

References Cited in the file of this patent

UNITED STATES PATENTS

| | | |
|---|---|---|
| 205,731 | Daniels | July 9, 1878 |
| 1,278,479 | Kellar | Sept. 10, 1918 |
| 1,983,757 | Hick | Dec. 11, 1934 |
| 2,228,123 | McMurray | Jan. 7, 1941 |
| 2,598,830 | Praeger | June 3, 1952 |